Figure 1:
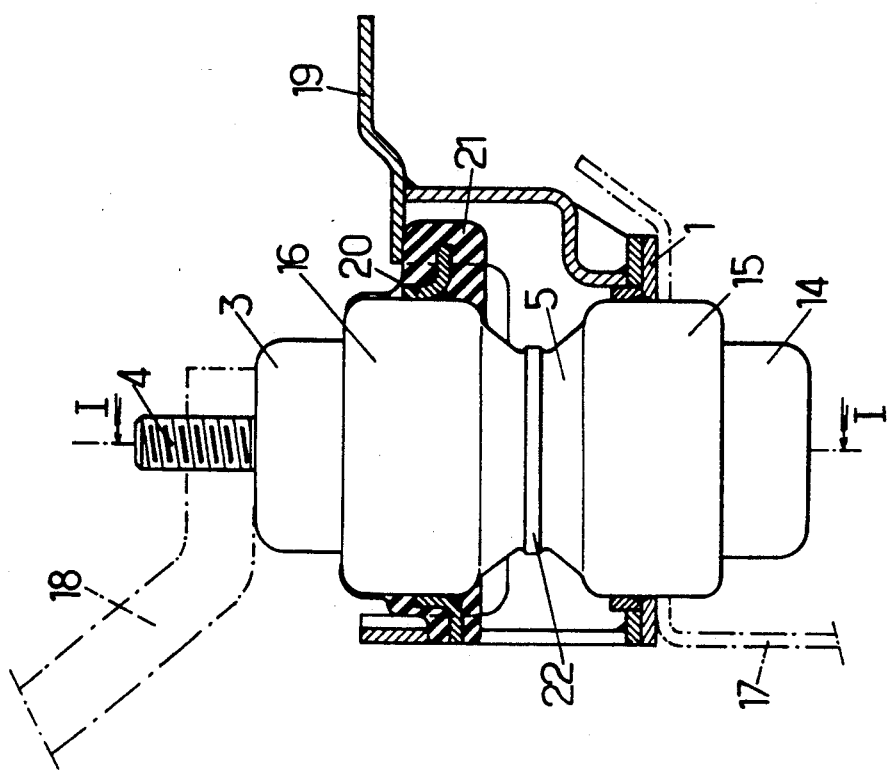

United States Patent [19]
Garety et al.

[11] Patent Number: 5,286,012
[45] Date of Patent: Feb. 15, 1994

[54] HYDRAULIC ANTIVIBRATION DEVICES

[75] Inventors: John F. Garety; Patrick E. Corcoran, both of Rockford, Mich.

[73] Assignee: Hutchinson, France

[21] Appl. No.: 879,331

[22] Filed: May 7, 1992

[51] Int. Cl.$^5$ .......................... F16F 13/00; B60K 5/12
[52] U.S. Cl. .................. 267/140.13; 267/219
[58] Field of Search ...................... 267/140.11, 140.13, 267/140.14, 219; 248/562, 636; 180/300, 313, 902

[56] References Cited

U.S. PATENT DOCUMENTS

| 4,621,795 | 11/1986 | Eberhard et al. | 267/140.13 X |
| 4,709,898 | 12/1987 | Yoshida et al. | 267/140.13 X |
| 5,088,700 | 2/1992 | Kanda et al. | 267/140.13 |
| 5,092,567 | 3/1992 | Wang | 267/140.13 X |

FOREIGN PATENT DOCUMENTS

| 0154268 | 9/1985 | European Pat. Off. | |
| 188637 | 9/1985 | Japan | 267/140.13 |
| 208649 | 10/1985 | Japan | 267/140.13 |
| 56643 | 3/1987 | Japan | 267/140.13 |
| 137440 | 6/1987 | Japan | 248/562 |
| 2216226 | 10/1989 | United Kingdom | 267/140.13 |

OTHER PUBLICATIONS

Patent Abstracts of Japan, vol. 9, No. 322 (M-440) (2045) Dec. 18, 1985; and JP-A-60 155 029 (Nissan Jidosha K.K.) Aug. 14, 1985.

Primary Examiner—Douglas C. Butler
Attorney, Agent, or Firm—Larson and Taylor

[57] ABSTRACT

The hydraulic antivibration mount is doubled up and practically symmetrical about a horizontal plane P. It comprises two rigid endpieces (1, 3) interconnected by an annular wall made of elastomer (5), with two flexible liquid-tight bellows (6, 10) and two intermediate rigid partitions (7, 11) respectively fitted with constricted passages (8, 12) and with decoupling valve members (9, 13).

3 Claims, 1 Drawing Sheet

HYDRAULIC ANTIVIBRATION DEVICES

The invention relates to hydraulic antivibration devices for placing between two rigid items such as a vehicle chassis and the engine of the vehicle for the purposes of damping, and of connection or mounting.

More particularly, the invention relates to such devices comprising:

two rigid endpieces suitable for securing to respective ones of the two rigid items to be interconnected;

an annular elastomer wall that withstands axial compression and that interconnects the two endpieces;

a flexible bellows carried by one of the two endpieces, referred to below as the "first" endpiece, and co-operating at least with the annular wall to form a liquid-tight pocket;

a mass of liquid filling said pocket;

a rigid partition carried by the first endpiece and extending between the bellows and the annular wall so as to subdivide the inside of the pocket into two liquid-tight chambers;

a constricted passage providing communication continuously between the two chambers; and, preferably, a diaphragm mounted in an opening of the rigid partition in such a manner as to be capable of vibrating through a limited amplitude between the two chambers.

As is known, with such a device:

oscillations of relatively large amplitude and relatively low frequency such as the oscillations due to the "choppiness" imparted to the vehicle by rough ground and applied to one of the rigid endpieces relative to the other one have the effect of urging the liquid from one of the two chambers into the other and back again via the constricted passage, with the mass of liquid moved in this way being caused to resonate when the frequency of said oscillations reaches a predetermined value which is a function of the ratio between the axial length and the right cross-section of the constricted passage, such resonance providing excellent damping of the oscillations concerned; and if the diaphragm is present, oscillations of relatively small amplitude and relatively high frequency such as those due to the engine running and applied on one of the rigid endpieces relative to the other one give rise to vibrations of the diaphragm that eliminate or at least attenuate the transmission of the vibrations under consideration: that is why the diaphragm is often called the "decoupling" diaphragm or valve.

In known embodiments of antivibration devices of the above kind, the second endpiece, i.e. the endpiece that does not carry the flexible bellows, constitutes a simple continuous end wall at the corresponding axial end of the pocket, and is indeed often embedded in the end wall portion of the annular wall, which is then made in the form of a conical cap or cup.

The main object of the invention is to increase the amount of damping provided for the mount under consideration or, which amounts to the same thing, to make it suitable for effectively damping higher mounted loads while retaining its flexibility, and to do this while increasing the mass of liquid that may be caused to resonate for a mount of given horizontal dimensions.

To this end, according to the invention, mounts of the kind under consideration are essentially characterized in that its second endpiece carries firstly a second flexible bellows defining the pocket with the first bellows and the annular wall, and secondly a second rigid partition extending inside said pocket between the second bellows and the annular wall and co-operating with the second bellows to delimit a third chamber, and in that a constricted passage is provided that puts the third chamber permanently into communication with the adjacent chamber, and preferably a diaphragm mounted in an opening through the second rigid partition so as to be capable of vibrating with limited amplitude between the two chambers concerned.

In other words, the mounts under consideration are doubled up.

Such doubling-up preferably gives rise to a structure that is practically symmetrical about a transverse plane intersecting the annular wall of elastomer.

In preferred embodiments, the annular wall made of elastomer is in the form of a length of tubing of substantially constant wall thickness that is constricted in its middle, i.e. it is made up of two truncated cones that are interconnected at their small bases, and a rigid reinforcing ring advantageously girdles the constricted collar of said annular wall.

It may be also advantageous to submit the elastomer annular wall to an axial prestress by placing the both rigid partitions between two rigid bearings of a same rigid box solid with one of the endpieces, with interposition of a resilient cushion between one at least of said partitions and the corresponding bearing.

In addition to its above main dispositions, the invention includes certain other dispositions which are preferably used simultaneously therewith and which are described in greater detail below.

A preferred embodiment of the invention is described below in non-limiting manner and with reference to the accompanying drawing.

Figure 2:
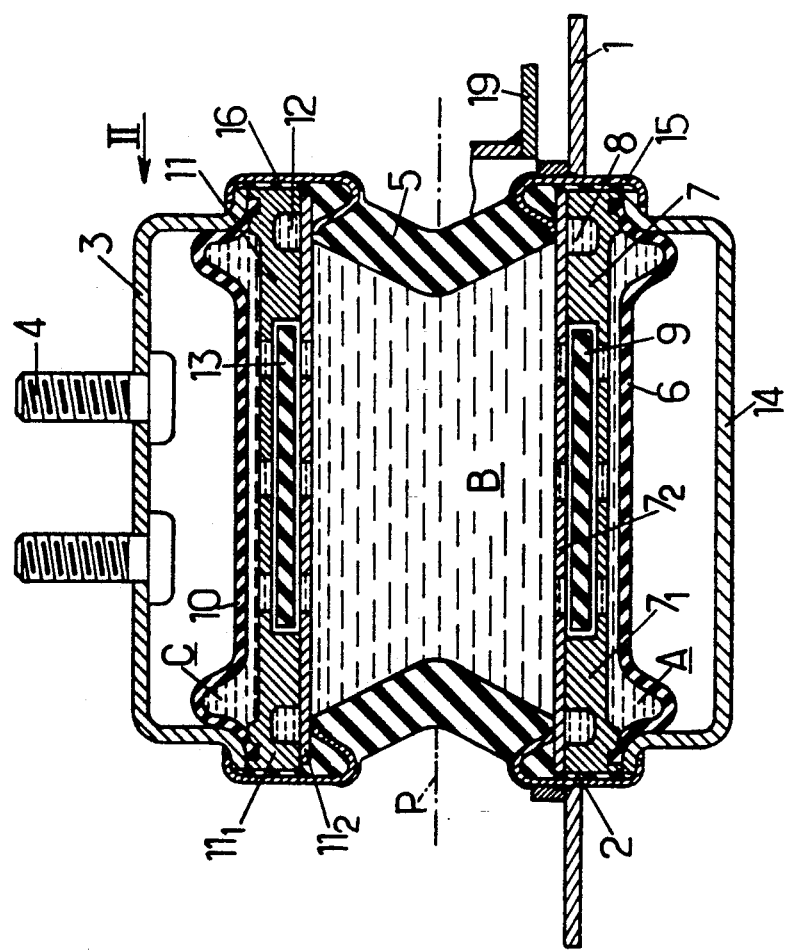

FIG. 1 of the drawing is a vertical section on plane I—I of FIG. 2 showing a hydraulic antivibration mount made in accordance with the invention, in its extended or relaxed position.

FIG. 2 shows the same mount seen end-on in the direction of arrow II in FIG. 1, and in a slightly prestressed state.

The mount under consideration comprises:

a rigid first endpiece 1 generally in the form of a horizontal plate pierced by a large opening 2;

a second rigid endpiece 3 in the form of a cover carrying two threaded bolts 4 pointing upwards for fastening purposes;

a tubular body 5 made of elastomer and having a vertical axis, but not necessarily being a body of rotation thereabout, the body being suitable for withstanding axial compression elastically and interconnecting the two endpieces 1 and 3, or more precisely connecting the rim of the opening 2 to the periphery of the cover 3;

a bottom first flexible and liquid-tight bellows 6 whose periphery is connected in liquid-tight manner to the rim of the opening 2 and to the bottom edge of the body 5;

a first intermediate rigid partition 7 extending across the opening 2 and subdividing the bottom portion of the mount into a lower first chamber adjacent to the bellows 6 and an upper second chamber B adjacent to the tubular body 5;

a first constricted passage 8 formed in particular in the periphery of the rigid partition 7 and providing permanent communication between the two chambers A and B;

a first moving diaphragm 9 mounted in an opening through the partition 7 so as to be capable of vibrating with limited amplitude between the two chambers A and B, the diaphragm being held captive with a small amount of vertical clearance between a relatively thin and perforated central portion of a first plate $7_1$ constituting the partition 7 and the perforated central portion of a second plate $7_2$ pressed against the plate $7_1$;

a top second flexible and liquid-tight bellows 10 whose periphery is connected in sealed manner both to the periphery of the cover 3 and to the top edge of the tubular body 5;

a second intermediate rigid partition 11 extending across the top end of the tubular body 5, which partition defines the top portion of the chamber B and co-operates with the second bellows 10 to delimit a third chamber C;

a second constricted passage 12 formed in particular in the periphery of the second partition 11 and providing permanent communication between the two chambers B and C;

a second moving diaphragm 13 mounted in an opening in the second partition 11 so as to be capable of vibrating with limited amplitude between the two chambers B and C, said diaphragm being held captive for this purpose with a small amount of vertical clearance, in the same manner as the above diaphragm 9 but between two perforated portions constituting respective parts of pressed-together plates $11_1$ and $11_2$ constituting the partition 11; and a mass of liquid filling all three chambers A, B and C, and also the constricted passages 8 and 12.

The horizontally outwardly folded peripheral edge of a bottom protective cup 14 is crimped in liquid-tight manner to the periphery of the bellows 6, to the periphery of the intermediate partition 8, and to the base of the tubular body 5 by means of a metal ring 15 which is itself welded to the edge of the opening 2 through the plate 1.

Similarly, a ring 16 crimps together the peripheries of the bellows 7, of the partition 11, and the top edge of the tubular body 5 made of elastomer.

The middle region of the body 5 has a constricted shape while its radial thickness remains practically the same over its entire extent: it may be thought of as being constituted by juxtaposing two truncated cones via their small bases.

Overall the mount is essentially symmetrical about a transverse plane P including the above-mentioned small bases.

The mount under consideration is intended, for example, for placing between a vehicle chassis 17 on which the plate 1 rests, and the internal combustion engine of the vehicle, with the engine case being extended by lugs 18 that are fixed to the cover 3 by means of nuts cooperating with the bolts 4.

FIG. 2 also shows a device for subjecting the mount to a small amount of vertical prestress: this device comprises a rigid box 19 suitable for bearing against the ring 16 or more precisely against an angle section member 20 surrounding said ring 16 via a bead of elastic material 21 covering said section member, the bottom of said box 19 being fixed to the plate 1.

The mount under consideration operates as follows:

When the top endpiece 3 is subjected to downwards displacement relative to the endpiece 1, the inside volume of the chamber B decreases, thereby expelling some of the liquid contained in said chamber B into the chambers A and C via the constricted passages 8 and 12, with flow in the reverse direction being observed whenever the endpiece 3 is urged upwards.

For a given value of the relatively low frequency of the relatively large amplitude oscillations generated in this way, resonance is observed in the columns of liquid contained in the two passages under consideration, thereby giving rise to effective damping of said oscillations.

When the relative forces exerted on the top endpiece relative to the bottom endpiece are of relatively low amplitude and of relatively high frequency, no particular back-and-forth motion of the liquid is observed in the constricted passages 12 and 13, but instead the diaphragms 9 and 13 are caused to vibrate having the well-known effect of filtering the transfer of the vibration from the first endpiece to the second, i.e. from the engine to the chassis.

The above-described mount has numerous advantages over previously-known mounts, and in particular the following advantage.

For a mount of given horizontal dimensions, the degree of damping that it can generate is considerably increased and is practically doubled in the preferred symmetrical construction given that the volume of liquid constituting the columns contained in the constricted passages is doubled or substantially doubled without otherwise changing the dimensions of each of the columns and thus the conditions under which they resonate.

Naturally, and as can be seen from the above, the invention is not limited in any way to the particular application and embodiment that are described above in detail. On the contrary, the invention extends to variants, and in particular:

variants in which one at least of the two partitions 7 and 11 would not be provided with a vibrating diaphragm (9,13), variants in which the central tubular body made of elastomer and withstanding axial compression has a shape other than that described above, for example its axial half-section may be W-shaped instead of being V-shaped, or it may be sinusoidal; and variants in which the strength of said body in axial compression is reinforced by a strength member made of metal or of other material and possibly embedded in said body, such as the ring which can be seen at 22 on FIG. 2, which ring girdles the restricted middle part of the elastomer body 5.

We claim:

1. A hydraulic antivibration device for interposing between two rigid items, the device comprising:

two rigid endpieces suitable for securing to respective ones of the two rigid items;

an annular elastomer wall that withstands axial compression and that interconnects the two endpieces, said annular elastomer wall including a length of tubing of substantially constant wall thickness, the wall having a middle which is constricted, forming two truncated walls that are interconnected at small bases;

a first flexible bellows carried by a first one of the two endpieces, and cooperating at least with the annular wall to form a liquid-tight pocket;

a mass of liquid filling said pocket;

a first rigid partition carried by the first endpiece and extending between the bellows and the annular wall so as to subdivide the inside of the pocket into a first and a second liquid-tight chamber;

a first constricted passage providing communication continuously between the two chambers;

a second flexible bellows, identical to said first flexible bellows and carried by a second one of the two endpieces, defining a pocket with the first bellows and the annular wall;

a second rigid partition, identical to said first rigid partition, and carried by the second endpiece extending inside said pocket between the second bellows and the annular wall and co-operating with the second bellows to delimit a third chamber;

a second constricted passage identical to said first constricted passage, providing the third chamber permanently into communication with an adjacent one of said first and second liquid-tight chambers;

a first diaphragm mounted in the opening of the first rigid partition for vibrating through a limited amplitude between the first and the second liquid-tight chambers; and a second diaphragm, identical to said first diaphragm, mounted in an opening through the second rigid partition for vibrating with limited amplitude between the third chamber and the adjacent chamber;

wherein said hydraulic antivibration device is substantially symmetrical about a transverse plane intersecting the annular wall by virtue of the first and second bellows being identical and by virtue of the first and second partitions being identical such that the efficiency of the device permits doubling for a given frequency.

2. A device according to claim 1, wherein a rigid reinforcing ring girdles the middle restricted collar of the annular elastomer wall.

3. A device according to claim 1, wherein the annular elastomer wall is axially prestressed by being placed between two rigid bearings of a same rigid box solid with one of the endpieces, with interposition of a resilient cushion between at least one of said partitions and the corresponding bearing.

* * * * *